May 16, 1944.  J. WRIGHT ET AL  2,349,067
PROTECTING DEVICE FOR LANDING WHEELS OF AIRCRAFT
Filed Sept. 2, 1942   2 Sheets-Sheet 1
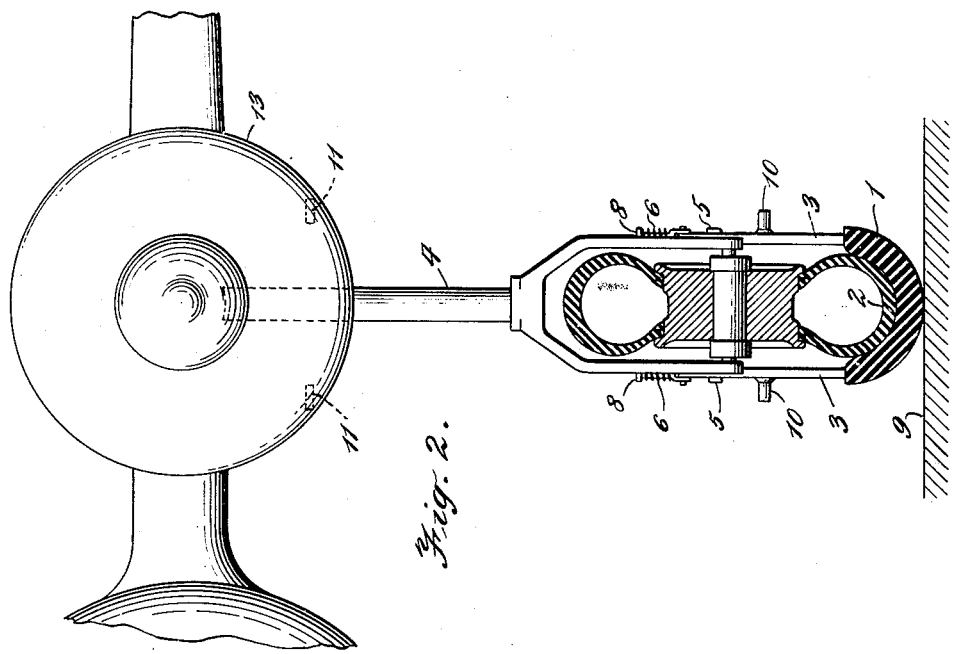
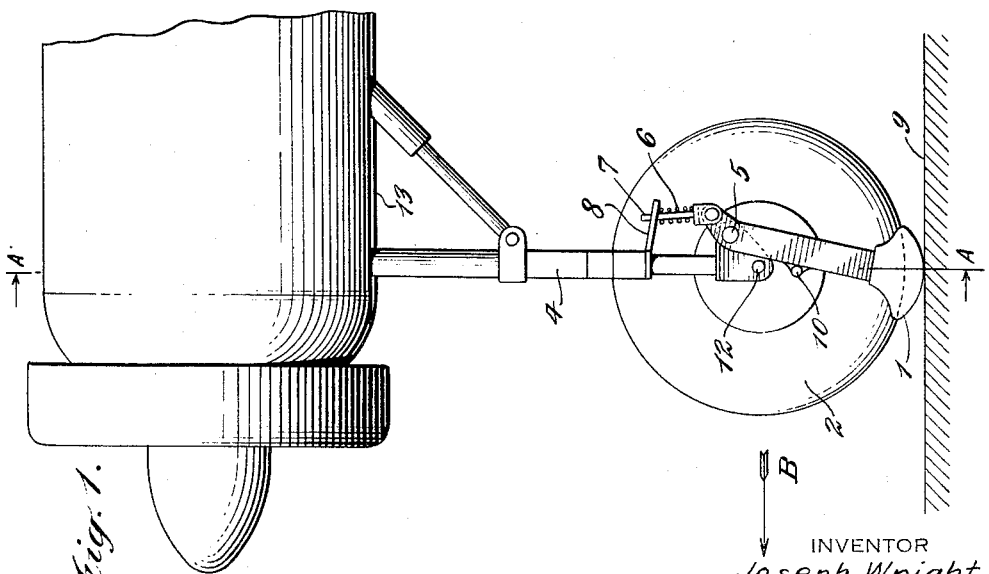
INVENTOR
Joseph Wright
and Henry Trevaskis
BY
THEIR ATTORNEY

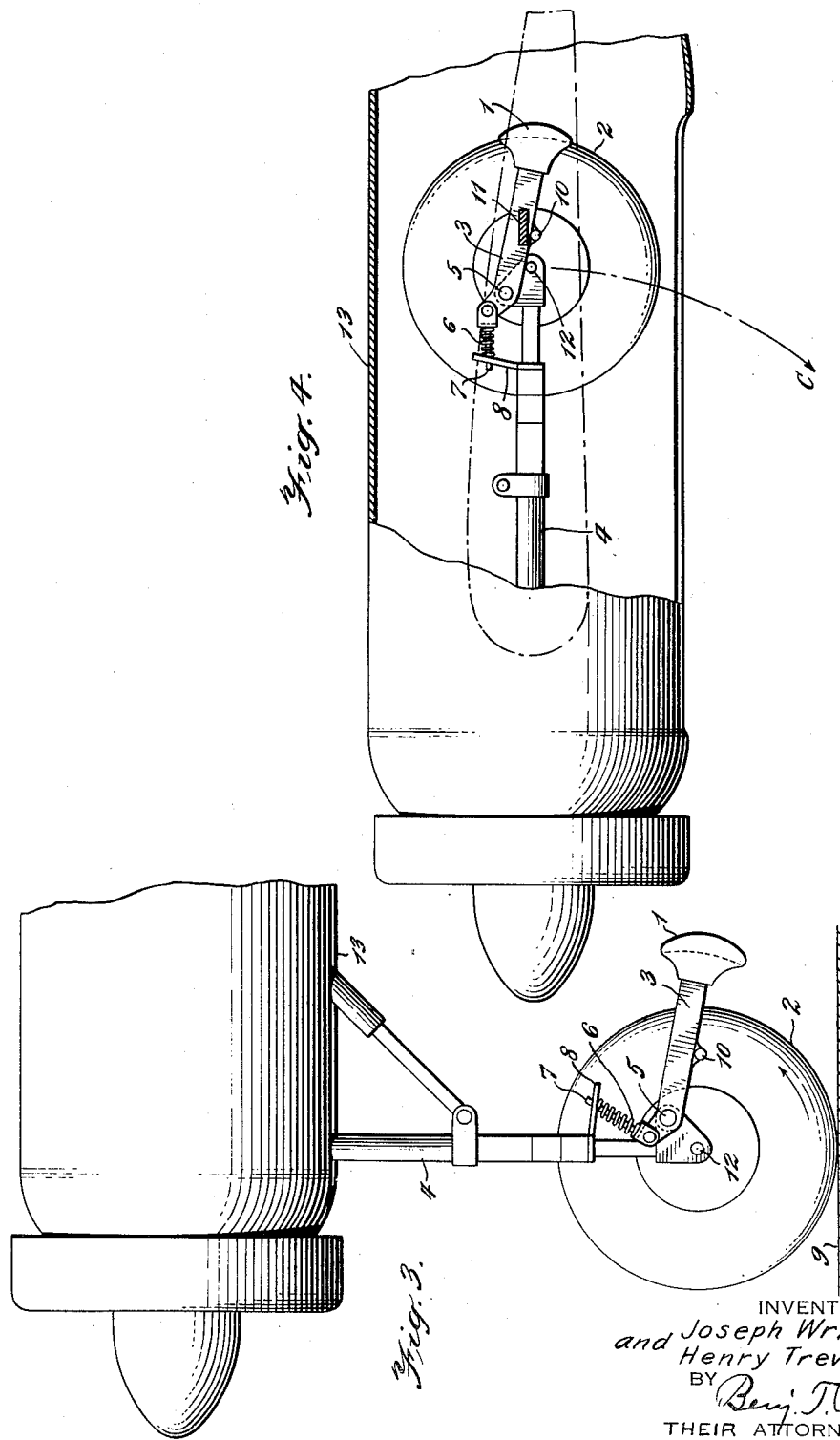

Patented May 16, 1944

2,349,067

UNITED STATES PATENT OFFICE 2,349,067

PROTECTING DEVICE FOR LANDING WHEELS OF AIRCRAFT

Joseph Wright and Henry Trevaskis, Hampton Lane, Solihull, England, assignors to Dunlop Rubber Company Limited, London County, England, a British company Application September 2, 1942, Serial No. 457,006
In Great Britain May 21, 1941

6 Claims. (Cl. 244—103)

Our invention relates to landing gear of aircraft and particularly to a protective means for protecting the tires of landing wheels from rapid wear, destruction or bursting.

Normally the wheels of aircraft when in the air are not rotating and when they are brought into contact with the ground on landing a rapid abrasion of the tires sets in until they have been brought to a speed of rotation corresponding to the speed of the aircraft. With aircraft moving at very high speeds the abrasion and wear and heat generated on contact of the tire with the ground is very destructive. This is particularly the case with wheels having a high inertia which must be overcome before they attain the speed of rotation corresponding to the speed of the plane or aircraft.

This excessive wear can be largely avoided if the wheel is rotated just before landing with a speed approximating to the landing speed of the aircraft, because in that case the wheel will roll on the ground and avoid sliding friction first encountered by a nonrotating wheel.

Our present invention provides a means whereby the wheel of an aircraft is given a rapid rotation just prior to its contact with the ground and whereby the force, or impact, of the aircraft on the ground is taken up just before the surface of the tire itself contacts with the ground. Moreover, our invention does not require mechanical attention prior to, or during, landing and serves to protect the tire whether the brakes are applied or not.

In our invention a tire of normal construction is provided with a shoe-like member supported, in one position, immediately under the tire throughout a limited area or segment thereof and in close contact therewith but rotatable with the tire to swing backwardly and out of contact therewith as a rotational movement is imparted to the tire.

This protective shoe, therefore, strikes the ground immediately beneath the tire, protecting the latter from abrasion or injury and at the same time receives the frictional abrasion action of the ground, and through this relative movement of the ground serves to spin the tire forwardly so that as the protective device moves out of position between the tire and the ground to permit contact with the wheel, the latter is already in rotation approaching the linear speed of the aircraft.

Our invention is illustrated, by way of example, in the accompanying drawings in which—

Fig. 1 is a side view of an aircraft landing wheel provided with a device for protecting the tire and rotating the wheel constructed in accordance with the invention and in the operative or landing position; Fig. 2 is a part sectional view on the line A—A of Fig. 1; Fig. 3 is a view corresponding to that of Fig. 1 but in which the wheel is in contact with the ground after displacement of the device to the inoperative position; Fig. 4 is a part sectional view of the wheel retracted for flight and the means for returning the device into contact with the tire in readiness for a further landing operation.

The invention is conveniently carried into effect by a member in the form of a shoe 1 which is U shaped in cross section and nests around the crown of the tire tread 2, the sides of the shoe extending upwardly on each side to embrace the crown of the tire at its base and being connected to arm 3 pivoted to the undercarriage or oleo leg 4 at points 5 eccentric and behind the wheel axis 12.

The shoe 1 may be formed or moulded of material harder than the tire, for example, it may be formed of metal, a synthetic resin or of hard rubber or any suitable combination of such materials and may taper in thickness from its central portion towards its front and trailing ends.

The shoe 1 is held in spring loaded engagement with the base of the tire 2 by a toggle spring in the form of a coil spring 6 carried on a spindle 7 which is pivoted at one end to the arm 3 and at the other end bears against an abutment 8 formed upon the oleo leg.

In the landing position shown in Fig. 1 the shoe 1 is held in spring loaded engagement with the tire 2 by the compression of the toggle coil spring 6 on the side of its dead center position.

On the shoe being struck rearwardly by contact with the ground 9, the toggle coil spring 6 is momentarily compressed by the movement of the arms 3 to cushion the rearward movement of the shoe and reasserts itself to retain the arms and shoe in the position shown in Fig. 3 wherein the shoe is shown disengaged from the tire tread at the end of its rearward movement.

It is necessary to return the shoe 1 during flight to the position shown in Fig. 1 in readiness for another landing and the drawings diagrammatically illustrate one method of effecting this operation in which the arms 3 are provided with lateral projections in the form of lugs 10, and during the retraction of the undercarriage from the position shown in Fig. 3 to that shown in Fig. 4, the lugs 10 contact stop projections 11, Figs. 2 and 4, formed, for example, on each side of the wheel well at the back of the engine nacelle 13 so that the arms 3 are moved over the dead center to place the shoe 1 into contact with the tire 2 in readiness to be extended therewith in the direction of the arrow C, Fig. 4, in readiness for a subsequent landing.

As the arms are moved over the dead center position the toggle spring 6 causes the shoe to engage with the retracted tire with a frictional grip.

It will be understood that the means for returning the shoe into contact with the tire are illustrated for wheels retractable in a direction parallel to the landing plane of the tire, but it will be readily understood that the invention may be modified for application to other tires of undercarriages.

If the aircraft flying in the direction of the arrow B, Fig. 1, is landed normally with the wheel brakes "off," the shoes will make initial contact with the ground and will be deflected rearwardly and upwardly, thereby imparting rotation to the wheel, the surface speed of rotation of the tire being substantially equal to the speed at which the shoe hits the ground thus avoiding damage to the tire.

If the aircraft is landed with the wheel brakes "on," the shoe 1 will remain in contact with the tire and will function as a skid.

Having described our invention, we claim:

1. Apparatus for protecting the tires of aircraft landing wheels which comprises a shoe conforming to the tire and covering a short length of its perimeter, a pair of swinging arms at opposite sides of said tire to support and carry said shoe forwardly into position to engage said tire at its lowermost point and swinging rearwardly free of said tire and a spring toggle to press said arms to their forward and rearward positions.

2. Aircraft landing gear which comprises retractable wheel supporting elements, a wheel rotatably supported on said supporting elements, a pair of arms pivoted on said supporting elements rearwardly of the axle of said wheel and a shoe supported by said arms to swing downwardly and rearwardly into contact with the tire of said wheel and backwardly free of said wheel, and a spring toggle contacting said arm and swinging past a dead center as said arm swings to its lowermost and rearmost positions.

3. Aircraft landing gear which comprises retractable wheel supporting elements, a wheel rotatably supported on said supporting elements, a pair of arms pivoted rearwardly of the axle of said wheel and a shoe supported by said arms to swing downwardly and forwardly into contact with the tire of said wheel and backwardly free of said wheel, a spring toggle contacting said arm and swinging past a dead center as said arm swings to its lowermost and rearmost positions, and means to engage said arms and swing them forwardly on their pivots as said landing gear is retracted.

4. Aircraft landing gear which comprises a landing wheel, a support for said wheel pivoted to swing rearwardly to retract said wheel, a pair of supporting arms pivoted to said wheel support to the rear of the axis of said wheel, a protective shoe carried by said arms to swing forwardly into position engaging and immediately beneath said wheel and rearwardly free of said wheel, a toggle spring to hold said arms in forward or rear position and projections on said arm to swing it to forward position when said wheel supporting elements are swung rearwardly to retracted position.

5. Apparatus for protecting the tires of aircraft landing gears which comprises a shoe, a carriage for said shoe pivoted nearer the rearmost part of the tire perimeter than to the lowermost part thereof to permit said shoe to swing out of contact with said tire when swung upwardly and rearwardly, and means to hold said carriage or shoe resiliently in either raised or lowered position.

6. Apparatus for protecting the tires of aircraft landing gears which comprises a shoe, a carriage for said shoe pivoted nearer the rearmost part of the tire perimeter than to the lowermost part thereof to permit said shoe to swing downwardly under said tire and rearwardly away from contact with said tire, and means to hold said carriage and shoe resiliently in either raised or lowered position.

JOSEPH WRIGHT.
HENRY TREVASKIS.